United States Patent
Buening et al.

(10) Patent No.: US 11,519,316 B2
(45) Date of Patent: Dec. 6, 2022

(54) INLET CONE AND PLATE ASSEMBLY FOR EXHAUST MODULE

(71) Applicant: Faurecia Emissions Control Technologies, USA, LLC, Columbus, IN (US)

(72) Inventors: Rick Buening, Vallonia, IN (US); Mark Lambrecht, Columbus, IN (US); Ryan Market, Rushville, IN (US)

(73) Assignee: Faurecia Emissions Control Technologies, USA, LLC, Columbus, IN (US)

( * ) Notice: Subject to any disclaimer, the term of this patent is extended or adjusted under 35 U.S.C. 154(b) by 79 days.

(21) Appl. No.: 17/082,133

(22) Filed: Oct. 28, 2020

(65) Prior Publication Data
US 2022/0127992 A1    Apr. 28, 2022

(51) Int. Cl.
*F01N 3/24* (2006.01)
*F01N 11/00* (2006.01)
*F01N 13/00* (2010.01)

(52) U.S. Cl.
CPC .............. *F01N 3/24* (2013.01); *F01N 11/002* (2013.01); *F01N 13/008* (2013.01); *F01N 2560/026* (2013.01); *F01N 2560/06* (2013.01)

(58) Field of Classification Search
CPC .. F01N 13/08; F01N 2240/20; F01N 2470/00; F01N 3/2892
See application file for complete search history.

(56) References Cited

U.S. PATENT DOCUMENTS

| | | | | |
|---|---|---|---|---|
| 2008/0256927 | A1* | 10/2008 | Kikuchi | F01N 3/10 60/299 |
| 2011/0107750 | A1* | 5/2011 | Kowada | F01N 1/089 60/299 |
| 2018/0156094 | A1* | 6/2018 | Balea | B01D 53/94 |
| 2019/0101041 | A1* | 4/2019 | Willats | F01N 13/148 |

FOREIGN PATENT DOCUMENTS

| | | | |
|---|---|---|---|
| CN | 209586470 U | 11/2019 | |
| CN | 209838506 U | 12/2019 | |
| DE | 102004057014 A1 * | 6/2005 | ............. F01N 13/08 |
| EP | 2175114 A1 | 3/2008 | |
| JP | 2009103068 A | 5/2009 | |
| JP | 2015113728 A * | 6/2015 | |

* cited by examiner

*Primary Examiner* — Anthony Ayala Delgado
(74) *Attorney, Agent, or Firm* — Carlson, Gaskey & Olds, P.C.

(57) ABSTRACT

An exhaust system includes a housing having an internal cavity defining an exhaust gas passage extending along an axis, at least one exhaust gas aftertreatment component positioned within the internal cavity, and an inlet cover mounted to the housing to provide an open internal area that is upstream of the internal cavity. The inlet cover has a contoured outer surface that includes an inlet opening and at least one sensor opening that is configured to receive an exhaust gas sensor. An inlet tube is mounted to the inlet cover at the inlet opening. A plate is positioned upstream of the at least one gas aftertreatment component and within the open internal area. The plate has a curved surface with a plurality of openings.

20 Claims, 4 Drawing Sheets

INLET CONE AND PLATE ASSEMBLY FOR EXHAUST MODULE

TECHNICAL FIELD

This disclosure relates generally to an inlet cone and plate configured to provide a compact exhaust module in a vehicle exhaust system.

BACKGROUND

Vehicles include exhaust systems that utilize a catalyst system to remove contaminants from engine exhaust gases. A Diesel Oxidation Catalyst (DOC) is used to oxidize nitric oxide (NO) to nitrogen dioxide (NO2), which is needed to support the performance of diesel particulate filters and Selective Catalytic Reduction (SCR) catalysts used for NOx reduction. Levels of NOx are reduced using ammonia as a reductant within the catalyst system. The DOC and SCR are enclosed within housings and are coupled together with additional exhaust components to provide the vehicle exhaust system. Packaging space for these components is always at a premium.

SUMMARY

An exhaust system according to an exemplary aspect of the present disclosure includes, among other things, a housing having an internal cavity defining an exhaust gas passage extending along an axis, at least one exhaust gas aftertreatment component positioned within the internal cavity, and an inlet cover mounted to the housing to provide an open internal area that is upstream of the internal cavity. The inlet cover has a contoured outer surface that includes an inlet opening and at least one sensor opening that is configured to receive an exhaust gas sensor. An inlet tube is mounted to the inlet cover at the inlet opening. A plate is positioned upstream of the at least one gas aftertreatment component and within the open internal area. The plate has a curved surface with a plurality of openings.

In a further non-limiting embodiment of the foregoing exhaust system, the plurality of openings includes at least one sensor opening.

In a further non-limiting embodiment of any of the foregoing exhaust systems, the at least one sensor opening is larger in size than all remaining openings of the plurality of openings.

In a further non-limiting embodiment of any of the foregoing exhaust systems, the at least one sensor opening provides a sensor tip clearance area for the exhaust gas sensor.

In a further non-limiting embodiment of any of the foregoing exhaust systems, remaining openings of the plurality of openings have different sizes from each other.

In a further non-limiting embodiment of any of the foregoing exhaust systems, the curved surface comprises a domed surface extending toward an upstream face of the at least one exhaust gas aftertreatment component.

In a further non-limiting embodiment of any of the foregoing exhaust systems, the at least one exhaust gas aftertreatment component comprises a DOC.

In a further non-limiting embodiment of any of the foregoing exhaust systems, the plurality of openings comprise a plurality of circumferential rows of openings where openings in each circumferential row are circumferentially spaced apart from each other about the axis, and wherein each circumferential row is radially spaced apart from an adjacent circumferential row.

In a further non-limiting embodiment of any of the foregoing exhaust systems, the plurality of circumferential rows are arranged in a plurality of zones that include at least a center zone surrounding a center of the plate, a first outer zone spaced radially outward of the center zone, a second outer zone spaced radially outward of the first outer zone, and an outermost zone spaced radially outward of the second outer zone, and wherein the center zone has openings having a first size, the first outer zone has openings having a second size larger than the first size, the second outer zone has openings having third size larger than the second size, and the outermost zone has openings having a fourth size that is smaller than the third size.

In a further non-limiting embodiment of any of the foregoing exhaust systems, the center zone, first outer zone, second outer zone, and outermost zone each include at least one circumferential row of openings, and wherein at least two of the center zone, first outer zone, second outer zone, and outermost zone include two or more circumferential rows of openings.

In a further non-limiting embodiment of any of the foregoing exhaust systems, the fourth size is greater than the first size.

In a further non-limiting embodiment of any of the foregoing exhaust systems, the fourth size is less than the second size.

In a further non-limiting embodiment of any of the foregoing exhaust systems, the plurality of openings includes at least one sensor opening that is larger in size than the openings in each circumferential row, and wherein the at least one sensor opening is located in at least one zone of the plurality of zones that is between the center zone and the outermost zone.

In a further non-limiting embodiment of any of the foregoing exhaust systems, the contoured surface includes a plurality of ribs.

In a further non-limiting embodiment of any of the foregoing exhaust systems, the at least one sensor opening comprises a plurality of sensor openings, and wherein the contoured surface comprises a mounting boss for each sensor, wherein the mounting bosses are circumferentially spaced apart from each other, and wherein at least one rib of the plurality of ribs is located circumferentially between adjacent mounting bosses.

An exhaust system, according to yet another exemplary aspect of the present disclosure includes, among other things, a housing having an internal cavity defining an exhaust gas passage extending along an axis, a DOC positioned within the internal cavity, and an inlet cover mounted to the housing to provide an open internal area that is upstream of the internal cavity. The inlet cover has a contoured outer surface that includes an inlet opening and at least one sensor opening that is configured to receive an exhaust gas sensor. An inlet tube is mounted to the inlet cover at the inlet opening. A plate is positioned upstream of the at least one gas aftertreatment component and within the open internal area The plate has a domed surface extending toward an upstream face of the DOC. The domed surface includes a plurality of openings and at least one sensor opening larger in size than the plurality of openings to provide a sensor tip clearance area for the exhaust gas sensor.

In a further non-limiting embodiment of any of the foregoing exhaust systems, the plurality of openings comprise a plurality of circumferential rows of openings where openings in each circumferential row are circumferentially spaced apart from each other about the axis, and wherein each circumferential row is radially spaced apart from an adjacent circumferential row; wherein the plurality of circumferential rows are arranged in a plurality of zones that include at least a center zone surrounding a center of the plate, a first outer zone spaced radially outward of the center zone, a second outer zone spaced radially outward of the first outer zone, and an outermost zone spaced radially outward of the second outer zone; and wherein the center zone has openings having a first size, the first outer zone has openings having a second size larger than the first size, the second outer zone has openings having third size larger than the second size, and the outermost zone has openings having a fourth size that is smaller than the third size.

In a further non-limiting embodiment of any of the foregoing exhaust systems, the center zone, first outer zone, second outer zone, and outermost zone each include at least one circumferential row of openings, and wherein at least two of the center zone, first outer zone, second outer zone, and outermost zone include two or more circumferential rows of openings.

In a further non-limiting embodiment of any of the foregoing exhaust systems, the fourth size is greater than the first size and less than the second size.

In a further non-limiting embodiment of any of the foregoing exhaust systems, the at least one sensor opening comprises a plurality of sensor openings, and wherein the contoured surface comprises a mounting boss for each sensor, wherein the mounting bosses are circumferentially spaced apart from each other, and wherein the contoured surface further comprises a plurality of ribs that extend in a radial direction, and where at least one rib of the plurality of ribs is located circumferentially between adjacent mounting bosses.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
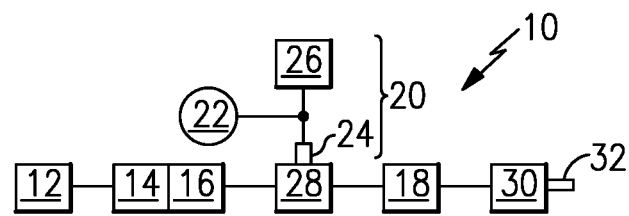
FIG. 1 illustrates a schematic view of a vehicle exhaust system.

This disclosure details an exemplary inlet cone and plate for a more compact exhaust module configuration in a vehicle exhaust system. FIG. 1 shows a vehicle exhaust system 10 that conducts hot exhaust gases generated by an engine 12 through various exhaust components to reduce emission and control noise as known. In one example configuration, an upstream exhaust component comprises a diesel oxidation catalyst (DOC) 14 that receives exhaust gases from the engine 12. The DOC 14 may also be associated with an optional diesel particulate filter (DPF) 16 that is used to remove contaminants from the exhaust gas as known. Downstream of the DOC 14 and optional DPF 16 are additional exhaust gas aftertreatment components that also remove contaminants from the exhaust gas as known.

In one example configuration, at least one Selective Catalytic Reduction (SCR) catalyst 18 is downstream of the DOC 14 and DPF 16. An injection system 20 is used to inject a reducing agent, such as a solution of urea and water for example, into the exhaust gas stream upstream from the SCR 18. The injection system 20 includes a fluid supply 22, a doser/injector 24, and a controller 26 that controls injection of the urea as known. An optional mixer 28 can also be positioned upstream of the SCR 18 such that the mixer 28 can mix the injected reducing agent and exhaust gas thoroughly together prior to entering the SCR 18. The SCR 18 utilizes the reducing agent to react with NOx to convert the pollutants into nitrogen, water, and small amounts of CO2. Exhaust gases exiting the SCR 18 are conducted to downstream exhaust components 30 such as resonators, mufflers, pipes etc., and eventually exit to atmosphere via a tailpipe 32. These components can be mounted in various different configurations and combinations dependent upon vehicle application and available packaging space.

Figure 2:
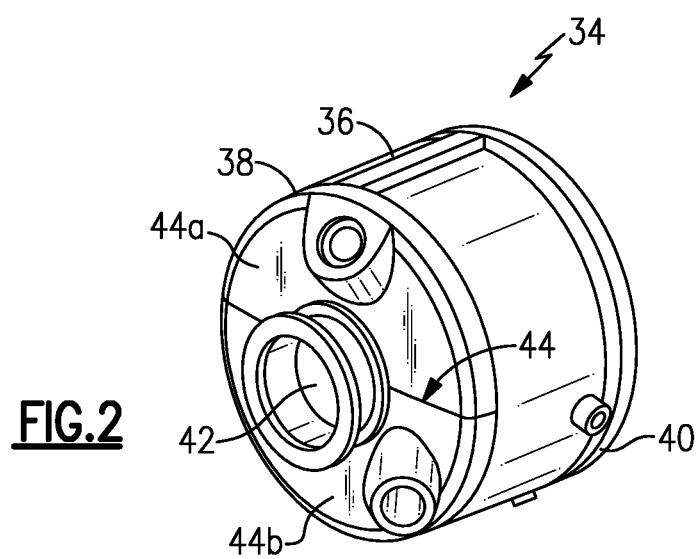
FIG. 2 is a perspective view of an exhaust module as used in the vehicle exhaust system of FIG. 1.

The subject disclosure provides for an exhaust gas aftertreatment catalyst substrate that is enclosed within an exhaust module configuration that is more compact than traditional configurations to free up more packaging space for other vehicle components. FIG. 2 shows an example of an exhaust module 34 having an outer housing or outer shell 36 extending between an upstream end 38 and a downstream end 40. The exhaust module 34 has an inlet 42 that receives heated engine exhaust gases. A heat shield 44 surrounds the inlet 42 and is, for example, formed in at least two shield sections 44a, 44b.

Figure 3:
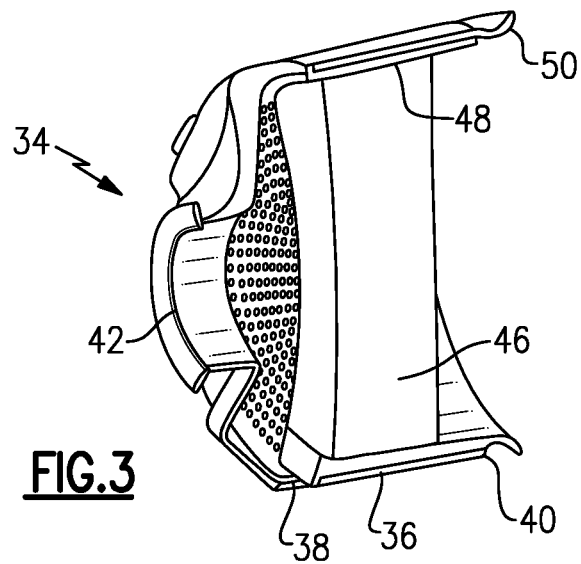
FIG. 3 is a perspective section view of the exhaust module of FIG. 3.

As shown in FIG. 3, an exhaust gas aftertreatment catalyst substrate, such as a DOC substrate 46 for example, is positioned within the module 34. The DOC substrate 46 is wrapped with an insulating mat 48 to securely hold the DOC substrate 46 within the outer shell 36. The downstream end 40 of the exhaust module 34 includes an outlet 50 to direct exhaust gases to downstream components.

Figure 4:
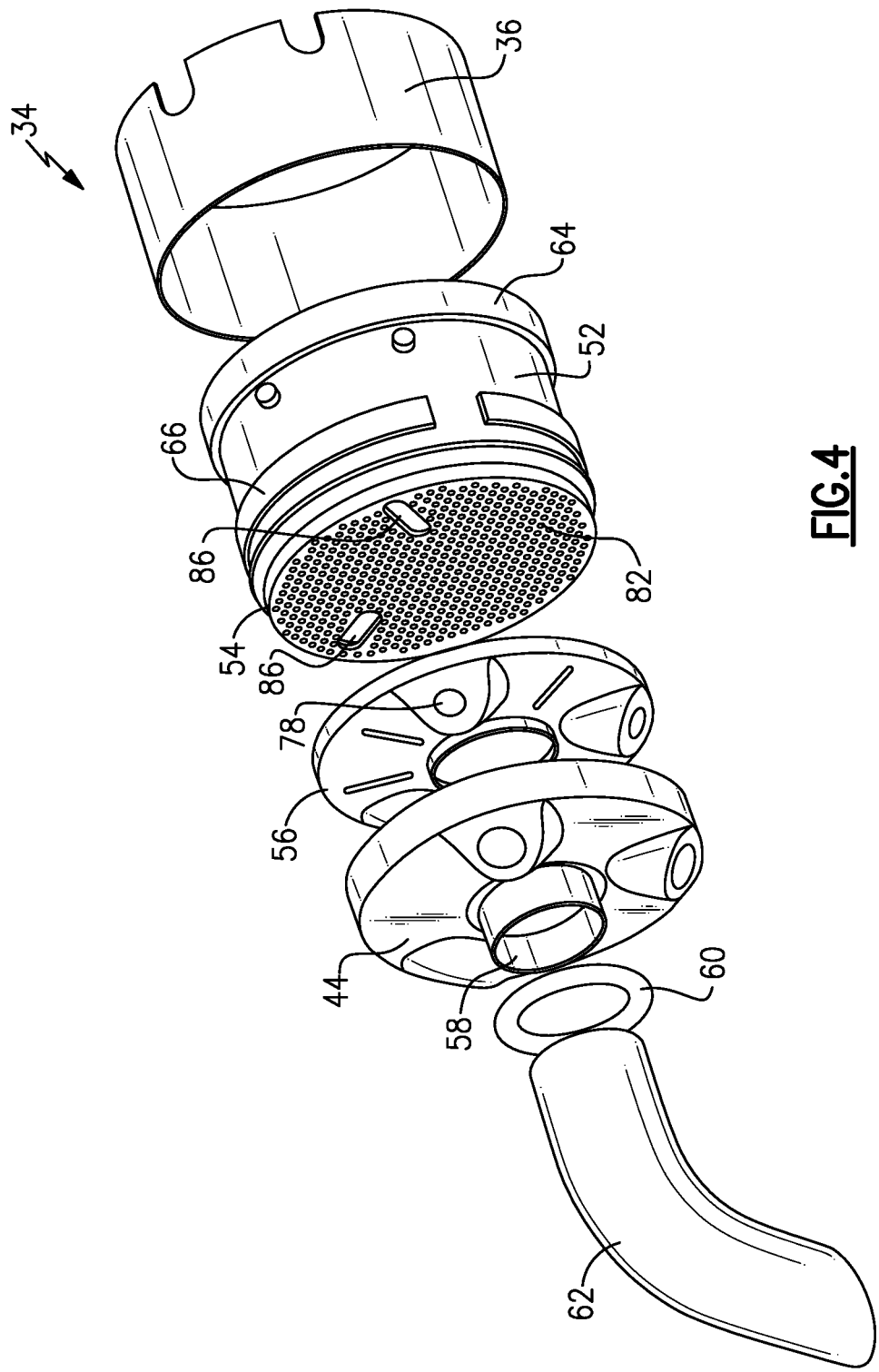
FIG. 4 is an exploded view of the exhaust module of FIG. 2.

FIG. 4 shows an exploded view of the exhaust module 34. The module 34 includes the DOC outer shell 36, a DOC inner shell 52 that is received within the DOC outer shell 36, a perforated baffle plate 54, an inlet cone or cover 56, and the heat shield 44. The module 34 also includes an inlet tube 58 at the inlet 42 to the exhaust module 34 and a flange 60 to facilitate connection to an additional exhaust component 62, such as a pipe for example. A blanking cover 64 is mounted around a downstream end of the DOC inner shell 52 and a rebar support 66 is mounted on an upstream portion of the DOC inner shell 52. The rebar support 66 is used to reinforce a mounting zone for support when the system is clamped to a vehicle framework.

Figure 5:
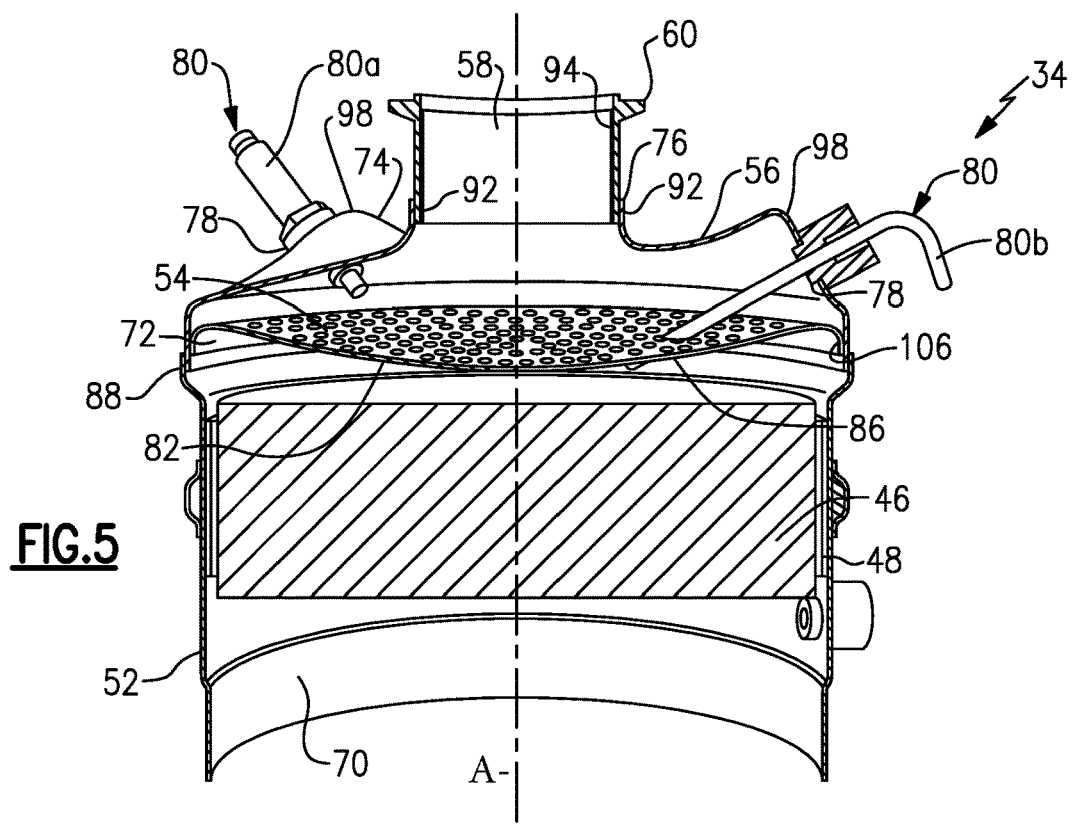
FIG. 5 is a side section view of the exhaust module.

FIG. 5 shows the exhaust module 34 in greater detail. The shell 52 comprises a cylindrical housing that provides an internal cavity 70 that defines an exhaust gas passage extending along an axis A. The DOC substrate 46 and mat 48 are positioned within the internal cavity 70. The inlet cone/cover 56 is mounted to the shell 52 to provide an open internal area 72 that is upstream of the internal cavity 70. The inlet cover 56 has a contoured outer surface 74 that includes an inlet opening 76 and at least one sensor opening 78 that is configured to receive an exhaust gas sensor 80. The inlet tube 58 is mounted to the inlet cover 56 at the inlet opening 76. The perforated baffle plate 54 is positioned upstream of the DOC substrate 46 and within the open internal area 72 of the cover 56. The plate 54 has a curved or domed surface 82 extending toward an upstream face of the DOC substrate 46. The domed surface 82 includes a plurality of openings 84 (FIG. 7) and at least one sensor opening 86 that is larger in size than the plurality of openings 84 to provide a sensor tip clearance area for the exhaust gas sensor 80.

In one example, the housing shell 52 has a lip 88 that surrounds a downstream end of the inlet cover 56. An inner surface of the lip 88 fits against an outer surface of the cover 56 at the downstream end such that the housing shell 52 and cover 56 are securely fixed together. The inlet tube 58 has a downstream end 90 that fits within a flange 92 formed to surround the inlet opening 76 in the cover 56. An upstream end 94 of the inlet tube 58 is fixed to the flange 60. In one example, the flange 60 comprises a Marmon flange.

Figure 6:
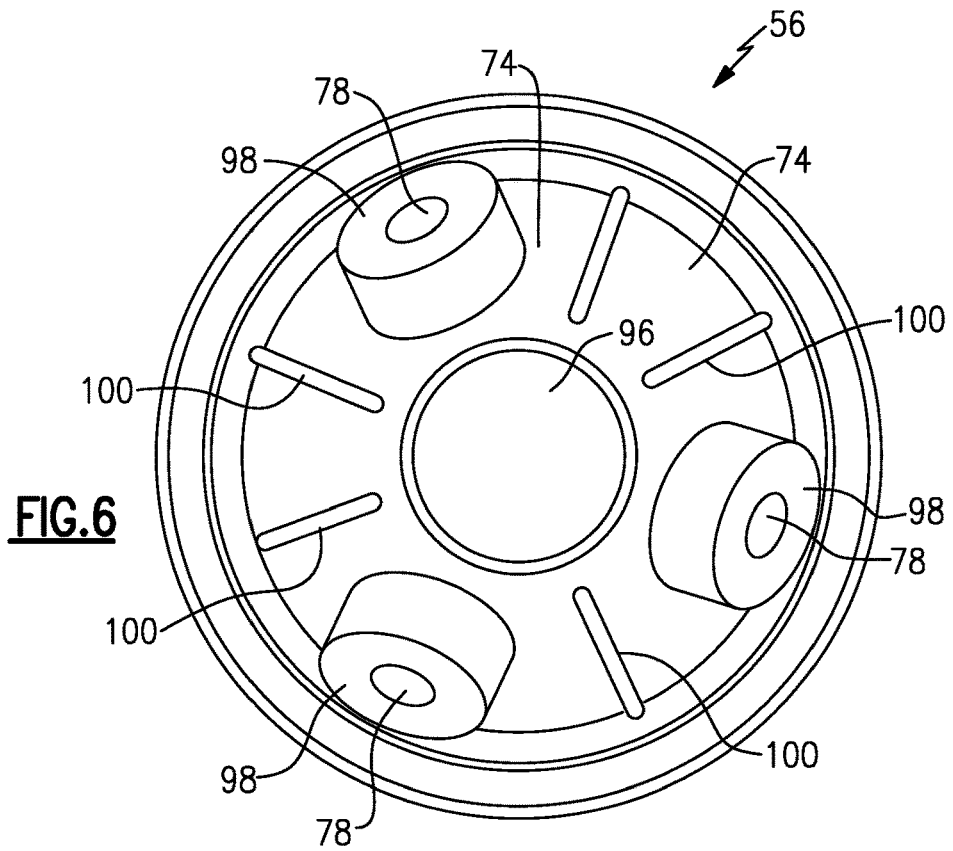
FIG. 6 is an end view of an inlet cover of the exhaust module.

In one example, the inlet cover 56 comprises a stamped component as shown in FIG. 6. The cover 56 is configured to have as short a length as possible to provide for a compact design. The contoured outer surface 74 includes a raised center boss 96 and a plurality of raised sensor mounting bosses 98 that are circumferentially spaced apart from each other about the axis A and center boss 96. The contoured surface 74 further comprises a plurality of ribs 100 that extend in a radial direction. In one example, at least one rib 100 is located circumferentially between adjacent mounting bosses 98. The ribs 100 provide increased stiffness for the inlet cover 56.

The inlet cover 56 is stamped and extruded to provide inlet opening 76 as shown in FIG. 6. The sensor portions of the cover 56 are formed in the stamping die and punched to provide the sensor openings 78 as shown in FIG. 5. In one example, there are at least two to three sensor openings 78 formed within the cover 56. In one example, there are at least two sensor openings 78 that receive sensors 80. In one example, a temperature sensor 80a is received within one sensor opening 78 and a NOx sensor 80b is received within another sensor opening 78. The NOx sensor is used to measure NOx content of the exhaust gas. The structure and operation of the temperature and NOx sensors 80a, 80b is known, and any type of NOx or temperature sensor can be used. The sensors collect and communicate to the controller 26.

The perforated baffle plate 54 includes at least one sensor opening 86 to provide for clearance for the NOx sensor 80b, for example, as shown in FIG. 5. In one example, each sensor 80a, 80b includes a sensor opening 86 in the plate 54 as shown in FIG. 4.

Figure 7:
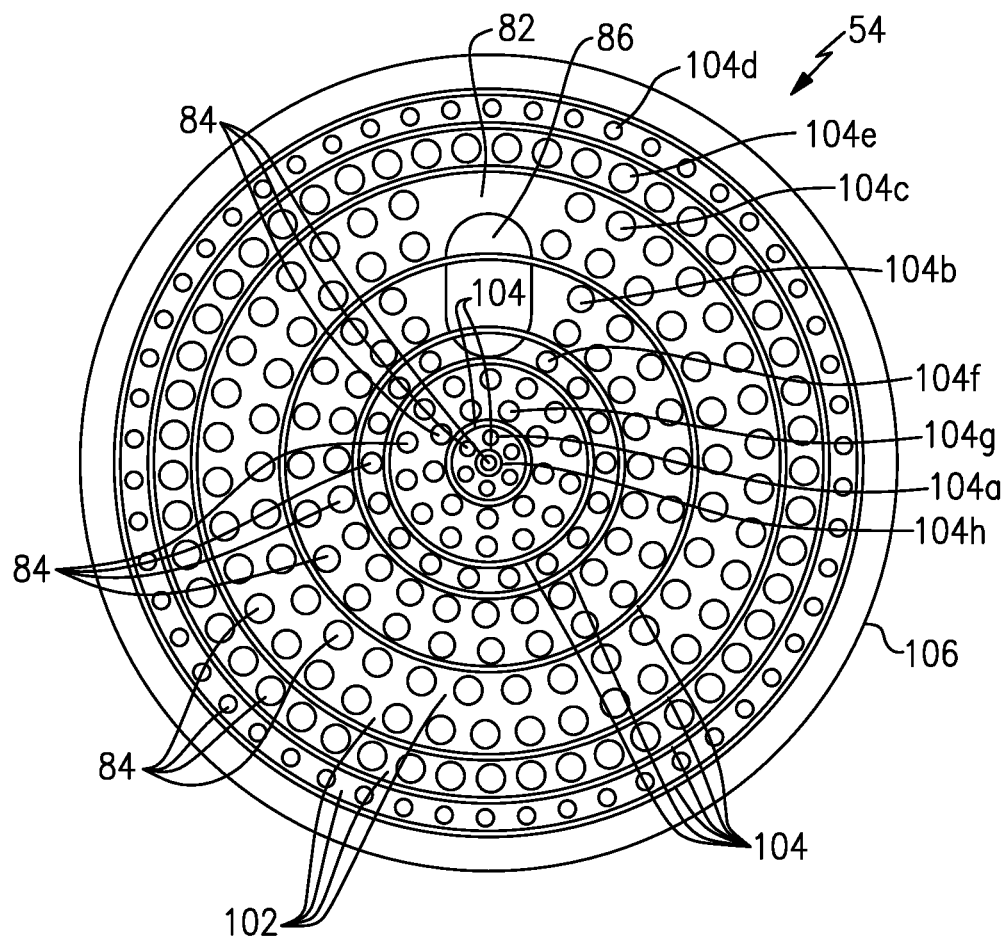
FIG. 7 is an end view of a perforated baffle plate of the exhaust module.

FIG. 7 shows an example of the other openings 84 that are formed within the domed baffle plate 54. The perforated baffle plate 54 extends across an entirety of the internal open area 72 of the cover 56 and across an entirety of an upstream face of the DOC substrate 46. The flow coming through the inlet cover 56 is distributed by the perforated baffle plate 54 across the upstream face of the DOC substrate 46. The pattern and hole size of the perforated baffle plate 54 are designed in order to optimize the best flow distribution into the DOC substrate 46 and not compromise the uniformity index (UI) target value of 0.98. In one example this is achieved by providing a plurality of openings 84 that are arranged in a plurality of circumferential rows 102, where openings 84 in each circumferential row 102 are circumferentially spaced apart from each other about the axis A. Additionally, each circumferential row 102 is radially spaced apart from an adjacent circumferential row 102. The plurality of circumferential rows 102 are arranged in a plurality of zones 104 that include at least a center zone 104a surrounding a center of the plate 54, a first outer zone 104b spaced radially outward of the center zone 104a, a second outer zone 104c spaced radially outward of the first outer zone 104b, and an outermost zone 104d spaced radially outward of the second zone 104c. Additional zones 104 may be located between these zones 104 a-d.

In one example, the center zone 104a has openings having a first size, the first outer zone 104b has openings having a second size larger than the first size, the second outer zone 104c has openings having third size larger than the second size, and the outermost zone 104d has openings having a fourth size that is smaller than the third size.

In one example, the center zone 104a, the first outer zone 104b, the second outer zone 104c, and the outermost zone 104d each include at least one circumferential row 102 of openings 84, and wherein at least two of the center zone 104a, the first outer zone 104b, the second outer zone 104c, and the outermost zone 104d include two or more circumferential rows 102 of openings 84.

In one example, the fourth size is greater than the first size and less than the second size.

In the example shown in FIG. 7, there are eight zones 104. More or less zones 104 could be utilized to optimize the flow dependent upon the size, e.g. diameter, of the plate 54. In the example shown in FIG. 7, there is an additional zone 104e that is directly between the outermost zone 104d and the second outer zone 104c. The openings 84 in this zone 104e have a fifth size that is less than the third size and greater than the fourth size. Two additional zones 104f and 104g are between the first outer zone 104b and the center zone 104a. In one example, zone 104f has openings 84 having a sixth size that is less that the second size and greater than the first size, while zone 104g has openings 84 having a seventh size that is less than the sixth size and greater than the first size. An additional zone 104h is located at the center axis and includes only one opening 84 that has an eighth size that is the same as the first size.

In one example, the first through eighth sizes range between 4.0 mm to 8.5 mm. In the example shown in FIG. 7, the second outer zone 104c has openings with the greatest size and the center zone 104a and zone 104h have openings with the smallest size.

In one example, the sensor opening 86 is substantially larger in size than the openings 84 in each circumferential row 102. This provides for a clearance area for a tip of the sensor 80. In one example, the sensor opening 86 is located in at least one zone 104 that is between the center zone 104a and the outermost zone 104d. In the example shown, the sensor opening 86 extends across multiple zones 104b, c, and f.

Baffle plate 54 includes a flange 106 that fits within the cover 56 as shown in FIG. 5. The flange 106 extends in an axial direction toward the DOC substrate 46 such that the domed surface 82 and flange 106 extend in the same direction. An outer surface of the flange 106 fits directly against an inner surface of the cover 56 to secure and fix the plate 54 and cover 56 together.

The subject disclosure provides for a compact and shortened inlet cone/cover and domed perforated plate assembly that reduce packaging space requirements for the exhaust module. Additionally, there is improved torch access to the Marmon flange and inlet tube areas to achieve proper manufacturing ability as compared to prior configurations.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An exhaust system comprising:
a housing having an internal cavity defining an exhaust gas passage extending along an axis;
at least one exhaust gas aftertreatment component positioned within the internal cavity;
an inlet cover mounted to the housing to provide an open internal area that is upstream of the internal cavity, the inlet cover having a contoured outer surface including an inlet opening and at least one sensor opening that is configured to receive an exhaust gas sensor;
an inlet tube mounted to the inlet cover at the inlet opening; and
a plate positioned upstream of the at least one gas aftertreatment component and within the open internal area, wherein the plate has a curved surface extending outwardly toward an upstream face of the at least one exhaust gas aftertreatment component, and wherein the curved surface includes a plurality of openings, and wherein the plate includes an outer peripheral flange that fits within a downstream end of the inlet cover, and wherein the outer peripheral flange extends in an axial direction toward the at least one gas aftertreatment component such that the curved surface and the outer peripheral flange extend in a common direction, and wherein the housing has a lip that surrounds an outer surface of a downstream end of the inlet cover, and wherein an inner surface of the lip fits against the outer surface of the inlet cover at the downstream end such that the housing and cover are securely fixed together.

2. The exhaust system according to claim 1 wherein the at least one exhaust gas aftertreatment component comprises a DOC.

3. The exhaust system according to claim 1 wherein the plurality of openings comprise a plurality of circumferential rows of openings where openings in each circumferential row are circumferentially spaced apart from each other about the axis, and wherein each circumferential row is radially spaced apart from an adjacent circumferential row.

4. The exhaust system according to claim 1 wherein the contoured surface includes a plurality of ribs.

5. An exhaust system comprising:
a housing having an internal cavity defining an exhaust gas passage extending along an axis;
at least one exhaust gas aftertreatment component positioned within the internal cavity;
an inlet cover mounted to the housing to provide an open internal area that is upstream of the internal cavity, the inlet cover having a contoured outer surface including an inlet opening and at least one sensor opening that is configured to receive an exhaust gas sensor;
an inlet tube mounted to the inlet cover at the inlet opening; and
a plate positioned upstream of the at least one gas aftertreatment component and within the open internal area, wherein the plate has a curved surface with a plurality of openings, and wherein the plurality of openings includes at least one sensor opening.

6. The exhaust system according to claim 5 wherein the at least one sensor opening is larger in size than all remaining openings of the plurality of openings.

7. The exhaust system according to claim 5 wherein the at least one sensor opening provides a sensor tip clearance area for the exhaust gas sensor.

8. The exhaust system according to claim 5 wherein remaining openings of the plurality of openings have different sizes from each other.

9. The exhaust system according to claim 5 wherein the curved surface comprises a domed surface extending toward an upstream face of the at least one exhaust gas aftertreatment component.

10. An exhaust system comprising:
a housing having an internal cavity defining an exhaust gas passage extending along an axis;
at least one exhaust gas aftertreatment component positioned within the internal cavity;
an inlet cover mounted to the housing to provide an open internal area that is upstream of the internal cavity, the inlet cover having a contoured outer surface including an inlet opening and at least one sensor opening that is configured to receive an exhaust gas sensor;
an inlet tube mounted to the inlet cover at the inlet opening; and
a plate positioned upstream of the at least one gas aftertreatment component and within the open internal area, wherein the plate has a curved surface with a plurality of openings, wherein the plurality of openings comprise a plurality of circumferential rows of openings where openings in each circumferential row are circumferentially spaced apart from each other about the axis, and wherein each circumferential row is radially spaced apart from an adjacent circumferential row, and wherein the plurality of circumferential rows are arranged in a plurality of zones that include at least a center zone surrounding a center of the plate, a first outer zone spaced radially outward of the center zone, a second outer zone spaced radially outward of the first outer zone, and an outermost zone spaced radially outward of the second outer zone, and wherein
the center zone has openings having a first size,
the first outer zone has openings having a second size larger than the first size,
the second outer zone has openings having third size larger than the second size, and
the outermost zone has openings having a fourth size that is smaller than the third size.

11. The exhaust system according to claim 10 wherein the center zone, first outer zone, second outer zone, and outermost zone each include at least one circumferential row of openings, and wherein at least two of the center zone, first outer zone, second outer zone, and outermost zone include two or more circumferential rows of openings.

12. The exhaust system according to claim 10 wherein the fourth size is greater than the first size.

13. The exhaust system according to claim 12 wherein the fourth size is less than the second size.

14. An exhaust system comprising:
a housing having an internal cavity defining an exhaust gas passage extending along an axis;
at least one exhaust gas aftertreatment component positioned within the internal cavity;
an inlet cover mounted to the housing to provide an open internal area that is upstream of the internal cavity, the inlet cover having a contoured outer surface including an inlet opening and a plurality of sensor openings that are configured to receive an exhaust gas sensor, and wherein the contoured outer surface includes a plurality of ribs, and wherein the contoured outer surface comprises a mounting boss for each sensor, wherein the mounting bosses are circumferentially spaced apart from each other, and wherein at least one rib of the plurality of ribs is located circumferentially between adjacent mounting bosses;
an inlet tube mounted to the inlet cover at the inlet opening; and
a plate positioned upstream of the at least one gas aftertreatment component and within the open internal area, wherein the plate has a curved surface with a plurality of openings.

15. An exhaust system comprising:
a housing having an internal cavity defining an exhaust gas passage extending along an axis;
a DOC positioned within the internal cavity;
an inlet cover mounted to the housing to provide an open internal area that is upstream of the internal cavity, the inlet cover having a contoured outer surface including an inlet opening and at least one sensor opening that is configured to receive an exhaust gas sensor;
an inlet tube mounted to the inlet cover at the inlet opening; and
a plate positioned upstream of the at least one gas aftertreatment component and within the open internal area, wherein the plate has a domed surface extending toward an upstream face of the DOC, and wherein the domed surface includes a plurality of openings and at least one sensor opening larger in size than the plurality of openings to provide a sensor tip clearance area for the exhaust gas sensor.

16. The exhaust system according to claim 15:
wherein the plurality of openings comprise a plurality of circumferential rows of openings where openings in each circumferential row are circumferentially spaced apart from each other about the axis, and wherein each circumferential row is radially spaced apart from an adjacent circumferential row;
wherein the plurality of circumferential rows are arranged in a plurality of zones that include at least a center zone surrounding a center of the plate, a first outer zone spaced radially outward of the center zone, a second outer zone spaced radially outward of the first outer zone, and an outermost zone spaced radially outward of the second outer zone; and wherein
the center zone has openings having a first size,
the first outer zone has openings having a second size larger than the first size,
the second outer zone has openings having third size larger than the second size, and
the outermost zone has openings having a fourth size that is smaller than the third size.

17. The exhaust system according to claim 16 wherein the center zone, first outer zone, second outer zone, and outermost zone each include at least one circumferential row of openings, and wherein at least two of the center zone, first outer zone, second outer zone, and outermost zone include two or more circumferential rows of openings.

18. The exhaust system according to claim 17 wherein the fourth size is greater than the first size and less than the second size.

19. The exhaust system according to claim 15 wherein the at least one sensor opening comprises a plurality of sensor openings, and wherein the contoured surface comprises a mounting boss for each sensor, wherein the mounting bosses are circumferentially spaced apart from each other, and wherein the contoured surface further comprises a plurality of ribs that extend in a radial direction, and where at least one rib of the plurality of ribs is located circumferentially between adjacent mounting bosses.

20. The exhaust system according to claim 10 wherein the plurality of openings includes at least one sensor opening that is larger in size than the openings in each circumferential row, and wherein the at least one sensor opening is located in at least one zone of the plurality of zones that is between the center zone and the outermost zone.

* * * * *